Patented May 29, 1951

2,554,597

UNITED STATES PATENT OFFICE 2,554,597

CATALYTIC PROCESS USING ISOPOLY AND HETEROPOLY ACIDS

William C. Starnes and Joseph B. McKinley, Pittsburgh, Pa., assignors to Gulf Research & Development Company, Pittsburgh, Pa., a corporation of Delaware No Drawing. Application June 3, 1948, Serial No. 30,983

15 Claims. (Cl. 196—24)

This invention relates to improvements in a catalytic process in which a polyacid is used as a suspensoid catalyst.

Polyacids, i. e., heteropoly and isopoly acids, have heretofore been used as suspensoid catalysts and have been found to have high activity. The usual procedure for using polyacids as catalysts has involved preparation of the polyacid followed by drying, grinding to a suitable fine particle size and addition of the polyacid particles to the substances undergoing catalytic treatment. We have found that only a considerably lower degree of the possible catalytic activity is achieved by this method of preparation.

This invention has for its object to provide an improved catalytic process utilizing a polyacid as a catalyst. Another object is to provide a process in which the full activity of a polyacid catalyst can be utilized. Another object is to improve the state of the art. Other objects will appear hereinafter.

These and other objects are accomplished by our invention which comprises utilizing in a suspensoid catalytic process a polyacid in flocculent form and having a large surface area which has been prepared by adding a solution of the polyacid to a liquid in which the polyacid is insoluble so as to form a flocculent precipitate.

In the following examples and description we have set forth several of the preferred embodiments of our invention but is it to be understood that these are given by way of illustration and not in limitation thereof.

The term "polyacid" is conventionally used to designate complex acids which contain several acidic radicals. Polyacids which contain one kind of acid radical are termed isopolyacids, but if one of the acid radicals is derived from another negative element the name heteropolyacid is applied. These acids are more fully described by Ephriam, Inorganic Chemistry, 4th edition, pp. 500–514, Nordeman Publishing Co., Inc., New York (1943). They contain water of constitution and may contain water of hydration. They function as polybasic acids. Examples are 12-tungsto-phosphoric acid, 9-tungsto-phosphoric acid, 12-molybdo-phosphoric acid, 9-molybdo-phosphoric acid, 12-tungsto-silicic acid, 12-molybdo-silicic acid, 10-tungsto-silicic acid, 9-tungsto-arsenic acid, 3-molybdo-arsenic acid, 12-tungsto-boric acid, 12-molybdo-titanic acid, 12-molybdo-germanic acid, 6-molybdo-6-tungsto-silicic acid, and metatungstic acid and certain polymeric acids containing molybdic acid radicals.

The polyacids may be prepared for the purposes of our invention by any prior art method such as acidifying an aqueous solution of salts of the desired acids. The polyacid thus formed may be extracted from the solution with a solvent and may be recovered from the solvent in a solid state. More detailed directions for the preparation of such polyacids are given in the Ephriam publication mentioned above, pp. 505–506, and by North and Beal, Journal American Pharmaceutical Association, vol. XIII, No. 10, pp. 889–897 (1924).

The polyacids are in general soluble in sulfur or oxygen containing organic compounds such as ethers, aldehydes, ketones and acids or their analogues in which oxygen is replaced by sulfur and such solvents can be used in accordance with our invention to form the solution from which the precipitate is formed. It appears that the polyacids form complexes with these solvents which are subsequently broken down into the flocculent precipitate and that this step of complex formation contributes to the activity of the catalyst. Examples of solvents which we have used to dissolve the polyacid are furfural, benzyl salicylate, methyl salicylate, tetradecyl mercaptan, 2-ethyl hexanol, di-methyl phthalate, beta-n-butoxy-ethyl salicylate, octaldehyde, amyl acetate, ethyl ether, Cellosolve acetate, phorone, normal butyl mercaptan, acetone, phenyl Cellosolve, methyl salicylate, ethyl acetate, 2-ethyl hexanol, carbitol acetate and water. An organic solvent is preferred since it forms a complex with the polyacid which breaks down to form a catalyst having greater surface area and activity. In general, a solvent which has a lower boiling point than the liquid in which the precipitation takes place should be used since it is often desirable to drive off the solvent by distillation.

This solution of the polyacid is then treated to cause formation of a suspension of the polyacid, preferably by adding the solution to the organic liquid which is to be catalytically converted and in which the polyacid is substantially insoluble. However, the solution may be added to an extraneous organic liquid in which the polyacid is substantially insoluble. The solvent for the polyacid may require removal to cause formation of a flocculent suspension of the polyacid, such removal being accomplished in any desired manner such as by heating and/or application of reduced pressure. In the event that the solution is added directly to the material to be catalytically converted, the resulting charge stock containing suspended polyacid is directly subjected to the catalytic conversion treatment in the conventional manner. In the event that the suspension is formed in an extraneous liquid, the suspension so formed may be used as a source of the catalyst and may be added in suitable amounts to the liquid to be catalytically converted and the resultant mixture treated in the catalytic converter in the usual manner. alternatively, the suspension may be separated, as by filtering or centrifuging and this separated paste added to a substance to be catalytically converted. It is preferable not to dry the precipitated floc, i. e., not to remove all of the liquid which wets the floc particles, thereby preventing progressive agglomeration.

It is advantageous to use a solvent for the polyacid which is soluble in the liquid to which it is added in order to form the suspension. This gives a better dispersion of the solution and probably results in a floc of smaller particle size. However, it is to be understood that this is not necessary and that the solvent for the polyacid may be insoluble in the material to which it is added, in which case it is desirable to add it with vigorous agitation while maintaining the medium to which it is added at a high enough temperature to flash off the immiscible solvent in order to obtain thorough distribution of polyacid. Also it is to be noted that removal of solvent to form a suspension may not be required if the liquid in which formation of the suspension is to take place is a non-solvent for the polyacid, but is miscible with the solvent containing the dissolved polyacid. In such case the solvent power of the solvent may be lost by mixing with the non-solvent, causing the suspension to form. During all stages of the above-mentioned preparations of a suspended polyacid, it is desirable to provide vigorous agitation of the medium in which the suspension is being formed. This results in smaller size of the floc particles and more uniform distribution of them.

The invention is of particular advantage in connection with suspensoid catalytic processes involving hydrogenation, oxidation or hydrodesulfurization. However, it is applicable to other catalytic reactions such as dehydrogenation, dehydration, etc. in which suspensoid catalysts are used. In these processes catalyst concentrations of from about 0.1 to 50 per cent by weight of the substance being treated may be used.

EXAMPLE I

A quantity of liquid complex of 12-molybdo-silicic acid and ethyl ether containing about 49 per cent by weight of the acid ($H_8[Si(Mo_2O_7)_6]$) was obtained according to the following general procedure: Seventy grams of ammonium paramolybdate [$(NH_4)_6Mo_7O_{24}.4H_2O$], which is equivalent to 0.396 mole of molybdenum trioxide, was dissolved in approximately 500 grams of water. The solution was neutralized with concentrated sulfuric acid and then mixed with 6.9 grams of a sodium silicate solution containing 8.9 per cent by weight of sodium oxide and 28.9 per cent by weight or 0.033 mole of silica. The mixture was brought to a pH of 2 with concentrated sulfuric acid and the warm solution resulting was stirred for approximately one hour. The cooled solution was treated with dilute hydrochloric acid, containing about 17 per cent by weight of hydrogen chloride and was shaken with ethyl ether saturated with the 17 per cent hydrochloric acid to extract the 12-molybdo-silicic acid which had formed. When the ether layer became saturated with the heteropoly acid, the complex described above separated from the ether. This complex was insoluble in the aqueous reaction mixture as well as in the saturated ether solution. Also, the liquid complex has a higher specific gravity than either the aqueous reaction mixture or the ether layer, so the complex settled to the bottom of the extraction vessel and was drained off and collected. The extraction process, as described above, may be repeated several times. Enough of this complex was dissolved in ethyl ether to form a dilute solution containing one gram of 12-molybdo-silicic acid ($H_8[Si(Mo_2O_7)_6]$) and 300 cc. of solvent. The concentration of the saturated ether extraction medium could have been adjusted, or dry, solvent-free 12-molybdo-silicic acid could have been dissolved in ether to obtain solutions substantially the same as the one obtained by dissolving the complex. In general, however, it is convenient to work with such complexes; they are easily formed during many preparations of heteropoly acids and have a virtually fixed composition. The solution containing 300 cc. of ethyl ether was added slowly with shaking to 200 grams of pressure still tar; the ether was then removed by heating at a temperature of 60° C. at a pressure of 50 mm. while bubbling air through the mixture. This left a suspension which was uniform and had very little tendency to settle out. This suspension, which may be referred to as containing a solution dispersed catalyst, will be hereinafter referred to as sample A.

A quantity of the complex of 12-molybdo-silicic acid and ethyl ether, prepared as described in the above paragraph, was heated in an oven at 110° C. to drive off the ether. The solid product, which was substantially pure unhydrated 12-molybdo-silicic acid, was ground to 200 mesh or finer. A gram of this material was stirred into 200 grams of pressure still tar. This mixture is hereinafter referred to as sample B.

A quantity of 12-molybdo-silicic acid was crystallized from aqueous solution and dried at 110° C. The crystalline material, which was substantially pure unhydrated acid, was ground to 200 mesh or finer and one gram of the ground material was dispersed in 200 grams of the pressure still tar. This mixture is hereinafter referred to as sample C.

175 grams of each of the mixtures A, B and C were charged with 8.5 grams of hydrogen in separate rocking bombs each having a volume of 1875 cc. The bombs were heated to and maintained at 855° F. for fifty minutes with an initially developed pressure of about 2100 p. s. i. g. In all runs the time for heating the bombs to reaction temperature was kept virtually constant as was the time for cooling the bomb to room temperature. The products were collected and analyzed and the results are given in Table I.

*Table I*

|  | Charge Stock | Sample A<br>Solution Suspended Heteropoly Acid | Sample B<br>Heteropoly Acid Dried From Ether Complex, 200 Mesh or Finer | Sample C<br>Heteropoly Acid Crystallized From $H_2O$ Solution and Dried, 200 Mesh or Finer |
|---|---|---|---|---|
| *Products (Weight Per Cent of Tar)[1]* | | | | |
| Gas ($C_4$ and Lighter) | | 7.6 | 8.6 | 8.3 |
| Gasoline (B. P. to 400° F.) | | 19.7 | 21.3 | 22.6 |
| Gas Oil (B. P. 400°–650° F.) | 21.9 | 38.5 | 34.9 | 35.5 |
| Residue (B. P. above 650° F.) | 78.1 | 33.9 | 34.8 | 33.3 |
| Coke | | 0.3 | 0.4 | 0.3 |
|  | 100.0 | 100.0 | 100.0 | 100.0 |
| $H_2$ Consumption, Weight, Per Cent of Tar | | 1.21 | 1.02 | 1.03 |
| Properties—Specific Gravity: | | | | |
| Gasoline at 60°/60° F | | 0.7580 | 0.7560 | 0.7500 |
| Gas Oil at 60°/60° F | 0.9408 | 0.9111 | 0.9165 | 0.9175 |
| Residue at 210°/60° F | 0.9881 | 0.9619 | 1.0143 | 1.0366 |
| Per Cent Olefins in Gasoline | | 5.6 | 16.1 | 14.4 |

[1] Corrected to 100 weight per cent of tar charged.

These results show that the lowest specific gravity residue and the greatest hydrogen consumption are obtained in the reaction using the solution dispersed catalyst (sample A). Since a principal effect of the introduction of a useful catalyst in the liquid or mixed phase destructive hydrogenation of hydrogen deficient heavy stock is to increase hydrogen consumption without increasing gasification and to prevent the degradation of the charge stock to a higher specific gravity residue, it is evident that the greatest activity has been obtained from the undried dispersed catalyst. An additional evidence of the higher hydrogenation activity is the lower olefin content of the gasoline obtained with sample A. It is to be noted that the catalyst obtained either by evaporating the ether from the heteropoly acid-ether complex or by crystallizing the acid from aqueous solution followed by drying were of lower activity.

EXAMPLE II

A series of hydrocarbon oxidation runs were set up to compare the catalytic activity of heteropolyacids which had been dispersed in an oil by precipitation from solution (samples I and II) with the activity of a heteropolyacid which had been prepared in dried form and finely ground before addition to the oil (sample III).

Five reaction samples, each containing a desired catalyst, were prepared, using as the hydrocarbon charge stock a heavy aromatic Texas oil. Partial inspection data for this heavy aromatic Texas oil are given in Table III. The individual samples were prepared as follows:

*Sample I.*—A solution of 0.483 gram of unhydrated, solvent-free 12-molybdo-silicic acid dissolved in 145 cc. of ethyl acetate was stirred into 100 grams of a light, aromatic Texas oil. The ethyl acetate was flash distilled from this mixture by slowly adding it to a still pot, heated somewhat above the boiling point of ethyl acetate. During the entire distillation a nitrogen stream was bubbled through the liquid being collected in the still pot, both to carry off the solvent and to agitate the suspension being produced. A liquid phase temperature of 230° C. was reached at the end of this operation, and substantially all the solvent was removed.

The resulting suspension of 12-molybdo-silicic acid in oil was cooled and centrifuged so as to obtain the suspended material in the form of a sludge. This sludge was added to the heavy aromatic Texas oil described in Table III so that the mixture contained 0.085 per cent unhydrated 12-molybdo-silicic acid by analysis and 0.76 per cent light Texas oil.

*Sample II.*—This sample was prepared in substantially the same way as sample I except that the heteropolyacid was dissolved in methyl isobutyl ketone and this solution was added to the light aromatic Texas oil followed by flash evaporation of the ketone to form a suspension in the oil. The sludge obtained by centrifuging this suspension was then added to the heavy Texas oil identified in Table III. The final mixture contained 0.082 per cent unhydrated 12-molybdo-silicic acid by analysis and 0.75 per cent light Texas oil.

*Sample III.*—Powdered unhydrated 12-molybdo-silicic acid was added to the heavy aromatic Texas oil of Table III containing 0.74 per cent of the light Texas oil so as to give a final sample which contained 0.085 per cent of the catalyst. This heteropolyacid was recrystallized from water, ground to 325 mesh or finer and dried at 125° C. until it was virtually free of water of hydration (i. e., it contained 97.5 per cent $SiO_2$ and $MoO_3$).

*Sample IV.*—A blend was prepared of the heavy aromatic Texas oil with 0.74 per cent of the light aromatic Texas oil. This was blank sample and contained no catalyst.

*Sample V.*—This sample was the same as Sample IV but contained additionally traces of both ethyl acetate and methyl-isobutyl ketone. This blank run was made to provide a check on the effect of possible trace amounts of solvent present in Samples I and II.

The Samples, each 300 ml., were charged to identical glass tubes of about 1500 ml. capacity and 4.1 cm. inside diameter which were supported in an oil bath maintained at 341° F. (±2° F.). An air stream of 10 liters/hr. was bubbled through each sample during the run by means of a glass tube extending nearly to the bottom of the reaction vessel. Neutralization and/or saponification numbers were determined on samples of the oils periodically; the 10-gram samples required were pipetted out at various time intervals without discontinuing the oxidation. At the end of the run, the remaining part of each sample was examined for the following properties and the results are given in Table II:

Sludge
Viscosity (on centrifuged samples)
Neutralization number
Saponification number Table II

| Sample No. | | Neutralization Number After— | | | | | Saponification Number After— | | Sludge (Naphtha Insolubles) After 264 Hrs., mg./10 g. | Viscosity Data After 264 Hrs., Centistokes at— | |
|---|---|---|---|---|---|---|---|---|---|---|---|
| | | 12 Hrs. | 60 Hrs. | 120 Hrs. | 168 Hrs. | 264 Hrs. | 144 Hrs. | 264 Hrs. | | 100° F. | 210° F. |
| I | Solution dispersed 12-molybdo-silicic acid | 0.50 | 1.14 | 2.40 | 2.55 | 3.61 | 21.5 | 31.8 | 577.5 | 737.0 | 27.90 |
| II | Solution dispersed 12-molybdo-silicic acid | 0.50 | 1.32 | 2.40 | 3.28 | 3.47 | 15.7 | 31.5 | 645 | 900.0 | 31.72 |
| III | 12-Molybdo-silicic acid recrystallized from H₂O; dried at 125° C., 325 mesh and finer. | 0.65 | 1.29 | 1.81 | 2.26 | 4.62 | 23.2 | 34.3 | 504.8 | 662.8 | 27.31 |
| IV | Blank (no catalyst) | 0.41 | 1.23 | 1.82 | 2.26 | 4.48 | 15.7 | 33.5 | 405.3 | 488.9 | 20.01 |
| V | Blank+Solvents | 0.47 | 0.94 | 1.67 | 2.11 | 4.26 | 13.3 | 32.6 | 442.5 | 571.0 | 24.88 |

Table III

Gravity—23.1° A. P. I.
Viscosity at:
 100° F.—centistokes, 111.9; S. U. S., 517
 130° F.—centistokes, 44.39; S. U. S., 206
 210° F.—centistokes, 9.01; S. U. S., 55.8
Viscosity index (A. S. T. M.)—40
Neutralization No.—0.03
Saponification No.—0.8
Ash, per cent—0.01
Sulfur, per cent—0.19

From the foregoing data it will be noted that the solution dispersed catalysts (samples I and II) are the most active. Over the first 168 hours the rise in neutralization number, which is a measure of the acid content, was most rapid in the reactions catalyzed by the solution dispersed heteropolyacid. Over this first period of the oxidation, catalytic effects are greater than during the last 100 hours because auto-catalytic effects then become important and disturbing in any attempted comparison. In addition, the changes in both the amount of naphtha insolubles and the viscosity values are considerably greater in the case of the solution dispersed catalyst. Increases in these latter two values are used to indicate the progress of oxidation in the evaluation of lubricating oil stability by the Indiana Oxidation Test (Rogers and Shoemaker, Ind. Eng. Chem., anal. ed., 6, pp. 419-420 (1934)), and may also be used here to indicate the progress of oxidation reactions.

EXAMPLE III

Two different 12-molybdo-silicic acid catalysts were prepared. One catalyst consisted of the unhydrated heteropolyacid, ground to 325 mesh or finer which was obtained by drying at 125° C. the heteropolyacid recrystallized from an aqueous solution (catalyst I). The other 12-molybdo-silicic acid catalyst (catalyst II) was prepared by dissolving the pure unhydrated heteropolyacid in secondary butyl alcohol. The acid was then dispersed in the oil under treatment by evaporating the alcohol from an agitated mixture of the solution, which contained the catalyst precursor, with the oil. The oil used in preparing catalyst II was a West Texas reduced crude which contained 1.8% sulfur; approximately 1.3 per cent by weight of catalyst was incorporated in 10 grams of the reduced crude. The same percentage of catalyst I was incorporated in another 10 gram sample of the same reduced crude. These samples, contained in glass reactor tubes of about 30 cc. capacity attached to the thermowell of an American Instrument Company 1875 cc. high pressure bomb, were heated to and maintained at 800° F. in the presence of hydrogen which developed a pressure of 750 p. s. i. g.

Each reaction product was removed from the reactor tubes by dissolving and washing it out with about 200 cc. of sulfur-free benzene. The catalyst was separated from the benzene solution by passing it through a fine fritted glass filter. The filtrate was then evaporated to about 25 cc. volume. This residue was analyzed for per cent sulfur in the amount of charge stock thus recovered. Total recovery of charge was 95-99 per cent. The results are given in the Table IV.

Table IV

| Catalyst Used | Run Time | Sulfur in Product |
|---|---|---|
| | Hours | Per Cent |
| I | 1 | 1.7 |
| II | 1 | 1.1 |
| None | 1 | 1.8 |
| II | ½ | 1.3 |
| I | ½ | 1.8 |

These results show that the solution dispersed catalyst is more active for hydrodesulfurization than the conventionally prepared suspensoid catalyst. Both at one-half and one hour reaction times (exclusive of constant heating up and cooling times) a greater removal of sulfur was catalyzed by the solution dispersed catalyst.

In order to form a suspension of the catalyst in the material to be catalytically converted it is necessary that this charge stock be in liquid condition. However, this does not mean that it must be a material which is normally liquid. Thus, it may be normally solid and the suspension formed or incorporated therein at elevated temperature necessary to melt the solid to form a liquid; the catalytic treatment of course would also take place in such type of operation that a liquid phase is present.

What we claim is:

1. In a catalytic process utilizing a catalyst suspended in the substance undergoing treatment, the improvement which comprises incorporating in the substance undergoing catalytic treatment a member of the group consisting of heteropoly and isopoly acids in flocculent form, said floc being obtained by adding a solution of said acid in an organic solvent to a liquid which is an non-solvent for the acid followed by formation of the flocculent acid in said liquid.

2. In a catalytic process utilizing a catalyst suspended in the substance undergoing treatment, the improvement which comprises adding to the substance undergoing catalytic treatment a member of the group consisting of heateropoly and isopoly acids which is in flocculent form, said floc still containing sufficient liquid to wet the particles thereof and, being obtained by adding a solution of the acid to an extraneous liquid in which the acid is substantially insoluble followed by removal of the major portion of the solvent.

3. In a catalytic process utilizing a catalyst suspended in the substance undergoing catalytic treatment, the improvement which comprises adding a solution of a member of the group consisting of heteropoly and isopoly acids to the substance to be catalytically treated and causing formation of a suspension of the acid therein.

4. In a catalytic process utilizing a catalyst suspended in the substance undergoing catalytic treatment, the improvement which comprises adding a member of the group consisting of heteropoly and isopoly acids dissolved in an organic solvent to the substance to be catalytically treated and removing the solvent to cause formation of a suspension of the acid therein.

5. In a catalytic process utilizing a catalyst suspended in the substance undergoing catalytic treatment, the improvement which comprises adding a heteropoly acid dissolved in an organic solvent to the substance to be catalytically treated and removing the solvent to cause formation of a suspension of the acid therein.

6. In a catalytic process utilizing a catalyst suspended in the substance undergoing catalytic treatment, the improvement which comprises adding meta tungstic acid dissolved in an organic solvent to the substance to be catalytically treated and removing the solvent to cause formation of a suspension of the acid therein.

7. In a catalytic process utilizing a catalyst suspended in the substance undergoing catalytic treatment, the improvement which comprises adding a solution of a member of the group consisting of heteropoly and isopoly acids in an organic solvent to a liquid which is a non-solvent for the acid whereby a flocculent acid is formed and adding this flocculent acid, without previous drying, to the substance undergoing catalytic treatment.

8. In a process of catalytic hydrogenation utilizing a catalyst suspended in the substance to be hydrogenated, the improvement which comprises incorporating in the substance to be hydrogenated a member of the group consisting of heteropoly and isopoly acids in flocculent form which is obtained by adding a solution of the acid to a liquid which is a non-solvent for the heteropolyacid followed by removal of the solvent.

9. In a process of catalytic hydrogenation utilizing a catalyst suspended in a liquid substance to be hydrogenated, the improvement which comprises adding to the liquid substance to be hydrogenated a solution of a member of the group consisting of heteropoly and isopoly acids and removing the solvent for the acid to form a suspension thereof in the liquid substance to be hydrogenated.

10. In a process of catalytic hydrogenation utilizing a catalyst suspended in a liquid substance to be hydrogenated, the improvement which comprises adding to the substance to be hydrogenated a solution of a heteropolyacid and removing the solvent for the heteropolyacid to form a suspension of the heteropolyacid in the liquid substance to be hydrogenated.

11. In a process of catalytic oxidation utilizing a catalyst suspended in a liquid substance to be oxidized, the improvement which comprises adding to the substance to be oxidized a solution of a member of the group consisting of heteropoly and isopoly acids and removing the solvent for said acid to form a suspension of the acid in the liquid substance to be oxidized.

12. In a process of catalytic oxidation utilizing a catalyst suspended in the substance to be oxidized, the improvement which comprises adding to the substance to be oxidized a member of the group consisting of heteropoly and isopoly acids which acid is obtained in a flocculent form by adding a solution of the acid to a liquid which is a non-solvent for the acid followed by removal of the solvent.

13. In a process of catalytic hydrodesulfurization utilizing a catalyst suspended in the substance to be hydrodesulfurized, the improvement which comprises adding to the substance to be hydrodesulfurized a member of the group consisting of heteropoly and isopoly acids which acid is obtained in a flocculent form by adding a solution of the acid to a liquid which is a non-solvent for the acid followed by removal of the solvent.

14. In a process of catalytic hydrodesulfurization utilizing a catalyst suspended in a liquid substance to be hydrodesulfurized, the improvement which comprises adding to the substance to be desulfurized a solution of a member of the group consisting of heteropoly and isopoly acids and removing the solvent for the acid to form a suspension of the acid in the liquid substance to be hydrodesulfurized.

15. In a process of catalytic hydrodesulfurization utilizing a catalyst suspended in a liquid substance to be hydrodesulfurized, the improvement which comprises adding to the substance to be hydrodesulfurized a solution of a heteropolyacid and removing the solvent for the heteropolyacid to form a suspension of the heteropolyacid in the liquid substance to be hydrodesulfurized.

WILLIAM C. STARNES.
JOSEPH B. McKINLEY.

REFERENCES CITED

The following references are of record in the file of this patent:

UNITED STATES PATENTS

| Number | Name | Date |
| --- | --- | --- |
| 1,882,712 | Andrussow et al. | Oct. 18, 1932 |
| 2,002,997 | Herold et al. | May 28, 1935 |
| 2,292,708 | Mavity | Aug. 11, 1942 |
| 2,352,484 | Kanhofer | June 27, 1944 |
| 2,377,577 | Ruthruff | June 5, 1945 |
| 2,420,477 | Hale et al. | May 13, 1947 |